United States Patent [19]
Wakabayashi et al.

[11] Patent Number: 5,808,672
[45] Date of Patent: Sep. 15, 1998

[54] APPARATUS FOR REMOVABLY MOUNTING AN ELECTRONIC CAMERA TO A COMPUTER SYSTEM

[75] Inventors: Manabu Wakabayashi; Iwao Aizawa, both of Yokohama; Shigeyuki Itoh, Kawasaki, all of Japan

[73] Assignee: Hitachi, Ltd., Tokyo, Japan

[21] Appl. No.: 911,601

[22] Filed: Aug. 14, 1997

Related U.S. Application Data

[63] Continuation of Ser. No. 325,925, Oct. 18, 1994, abandoned.

[30] Foreign Application Priority Data

Oct. 21, 1993 [JP] Japan .................................. 5-263346

[51] Int. Cl.$^6$ .................................................. H04N 5/225
[52] U.S. Cl. ........................... 348/220; 348/552; 361/737
[58] Field of Search ..................................... 348/207, 220, 348/373, 374, 375, 376, 552, 230, 231; 396/297, 300, 429; 439/946, 946.2, 76.1; 361/737, 683, 686; 395/892, 893; H04N 5/225

[56] References Cited

U.S. PATENT DOCUMENTS

| | | | |
|---|---|---|---|
| 4,915,333 | 4/1990 | Bolondi .................................. | 354/293 |
| 5,227,988 | 7/1993 | Sassaki et al. ...................... | 364/703.01 |
| 5,231,501 | 7/1993 | Sakai et al. ............................ | 348/220 |
| 5,247,330 | 9/1993 | Ohyama et al. ....................... | 348/373 |
| 5,365,269 | 11/1994 | Holmes et al. ........................ | 348/297 |
| 5,438,359 | 8/1995 | Aoki ....................................... | 348/373 |
| 5,450,140 | 9/1995 | Nashino ................................. | 348/722 |
| 5,708,853 | 1/1998 | Sanemitsu .............................. | 395/893 |

OTHER PUBLICATIONS

"Cameo Personal Video System" Published by D.I.T., Mar. 1993.
"ICCE Digest of Technical Papers", pp. 166–167, Jun. 1993.
"IC Memory–Card Guide Lines", Jeida, 1991, pp. 1–2, 14–16.

Primary Examiner—Andrew I. Faile
Assistant Examiner—Tuan V. Ho
Attorney, Agent, or Firm—Antonelli, Terry, Stout & Kraus, LLP

[57] ABSTRACT

A computer system is provided on the front surface thereof with a connection slot into which a card type holder is inserted for connecting an electronic camera to the computer system. The holder has a connector at one end, a camera head connector at the other end, and a signal processing unit in an intermediate portion. The camera head is supported rotatably in the vertical direction or the horizontal direction relative to the holder.

25 Claims, 8 Drawing Sheets

APPARATUS FOR REMOVABLY MOUNTING AN ELECTRONIC CAMERA TO A COMPUTER SYSTEM

This application is a continuation application of Ser. No. 08/325,925, filed Oct. 18, 1994, now abandoned.

BACKGROUND OF THE INVENTION

The present invention relates to an apparatus for removably mounting an electronic camera to a computer system, and more particularly to a mounting apparatus which can readily and securely mount an electronic camera to a computer system and also freely adjust an imaging direction of the electronic camera.

In personal computer communication systems, there has also been developed a system which can transmit and receive, in addition to messages, character data and so on, the image of a person who is communicating through a personal computer so as to allow the other party to confirm with whom he is communicating. Particularly with the development of multimedia systems, a demand for mutually transmitting and receiving images of personal computer communication users will become increasingly higher.

Conventionally, an apparatus of this kind employs a video camera having an analog television signal output terminal which is connected through a coaxial cable to an interface circuit board called a video capture board incorporated in or externally attached to a computer system, such that analog video signals from the video camera are converted to digital signals by the computer system for displaying on the screen. A brochure named "Cameo Personal Video System" published by Kabushiki Kaisha D.I.T. (as of March 1993) shows a camera module (having a height of 9 cm, width of 11 cm, depth of 22.5 cm, and bottom of 9 cm) placed on a display unit of a computer and a video processor module mounted on a side face of a computer (having the dimensions of 5 cm×30 cm×20 cm). These modules constitute a system for converting analog signals from the camera module to digital signals by the video processor module for displaying images on a CRT display.

Incidentally, some of recent video cameras are provided with a camera signal processing circuit (hereinafter called "CAM-DSP") employing a digital signal processor (hereinafter abbreviated as "DSP") to realize a reduced size and weight of the video camera. A known example of such video cameras is described in "A 0.8 μm CMOS Digital Signal Processor for a Video Camera" by Ohtsubo et al in ICCE DIGEST OF TECHNICAL PAPERS, pp 166–167 (June 1993). Conventional devices connected to the camera, such as a video tape recorder (VTR), a television monitor, and so on require analog signals, so that a video camera employing DSP needs to convert a digital signal to an analog signal before outputting it to these devices. For this reason, when a video camera, even if employing DSP, is connected to a computer system, the computer system requires a means for reconverting an inputted analog signal to a digital signal.

In the above-mentioned known example, since a video camera is supported on a dedicated carrier, a tripod, or the like and installed on a computer system or the side of the same, the video camera occupies a relatively large area. The video camera thus installed may be unstable when a shock is given thereto. Also, there is a fear that the video camera of this shape an be dropped when it is transported from one place to another. Furthermore, it takes much time to adjust the camera angle to accommodate a subject within a visual field of the video camera, thus presenting an inferior usability.

When a video camera employing DSP is used with a computer system, if the system is configured to receive a digital signal generated by the video camera as it is, without converting it to an analog signal, a digital-to-analog convertor (DAC), an analog signal output amplifier and so on, which consume large electric power, can be removed from the video camera. However, moving picture information generated by a television, when digitized, includes an extremely large amount of data per unit time, so that a high speed data transmission path must be provided for inputting such large amount of data to the computer system.

A high speed data transmission path in turn implies problems of distorted data waveforms due to a low pass filter effect caused by a transmission path resistance and parasitic capacitance, and radiation of high frequency noise (unnecessary radiation). In general, reduction of waveform distortion is in a contrary relation with reduction of generated noise. For reducing both waveform distortion and generated noise, the data transmission path must be provided with an output amplifier having a large transmission power, connection cables having a strong electromagnetic shield effect, and so on, so that increased manufacturing cost and power consumption are inevitable. For solving the problems while a low-cost and low-power-consumption policy is maintained, a key to consider is how to realize the transmission path as short as possible.

SUMMARY OF THE INVENTION

It is an object of the present invention to provide an apparatus for removably mounting an electronic camera to a computer system, which is capable of removably but securely mounting an electronic camera to a computer system as well as adjusting the position of the electronic camera in an arbitrary imaging direction.

According to the mounting apparatus provided by the present invention, an electronic camera has a holder including a connector for outputting signals from a video signal processing circuit connected to a camera head. The mounting apparatus is constructed in such a manner that the holder supports the camera head rotatably in the horizontal direction or the vertical direction. The holder is inserted into a slot provided on an outer surface of the computer system in order to mechanically and electrically couple the electronic camera to the computer system.

According to the present invention, since the holder included in the electronic camera is inserted into the slot on the outer surface of the computer system for coupling the electronic camera to the computer system, the electronic camera is stably secured to the computer system.

By supporting the electronic camera rotatably in the vertical direction or the horizontal direction, the image of a subject is more easily accommodated within a visual field of the electronic camera. Since a computer user generally sits to the front of a computer system having a display screen, the electronic camera connected to the front surface, side surface, top surface, or bottom surface can readily capture part or all of the user's image from the frontal direction.

Also, by providing a connector in an output section of a signal processing circuit for a video camera such that the connector is inserted into a connection slot disposed on the front surface, side surface, top surface, or bottom surface of a computer system for connecting the video camera to the computer system, a high speed digital signal can be directly inputted to the computer system without intervention of a connection cable or the like.

DESCRIPTION OF THE PREFERRED EMBODIMENTS

Figure 1:
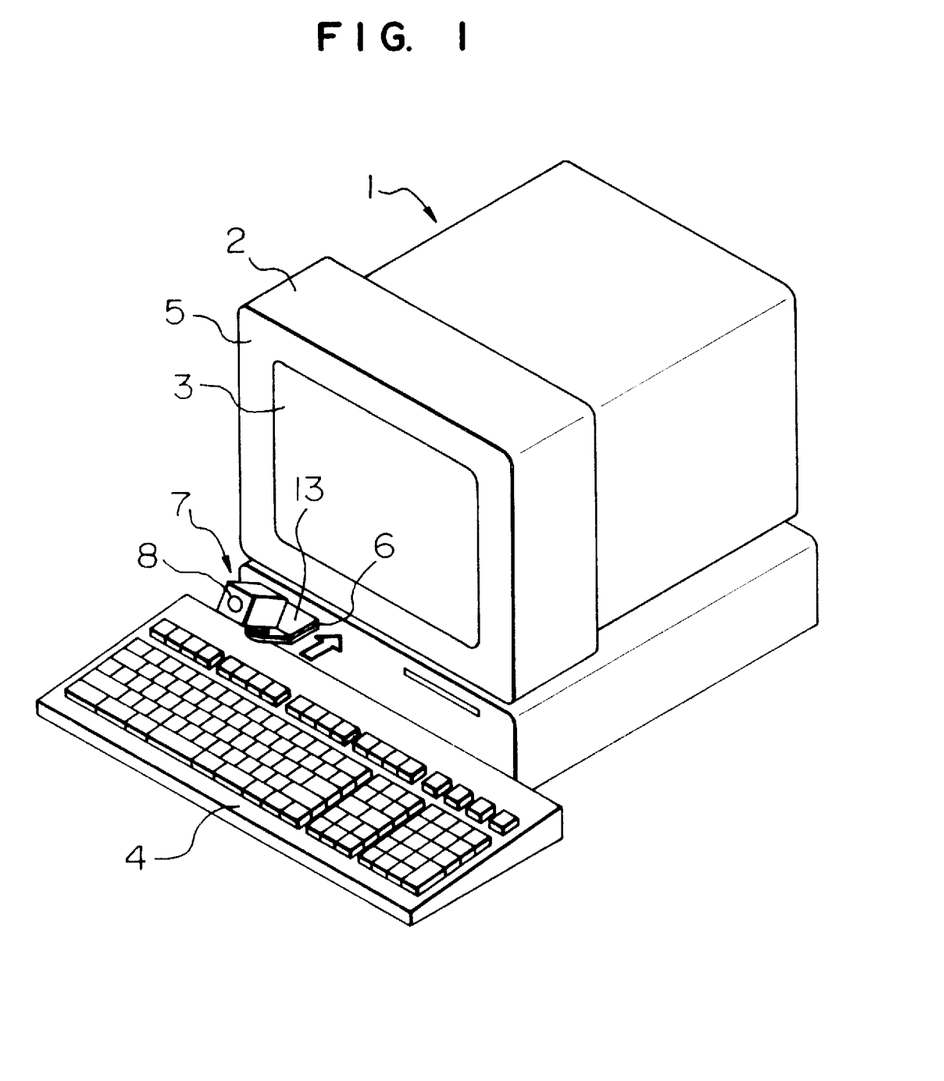
FIG. 1 is a perspective view showing the external appearance of a first embodiment of the present invention.
Figure 2:
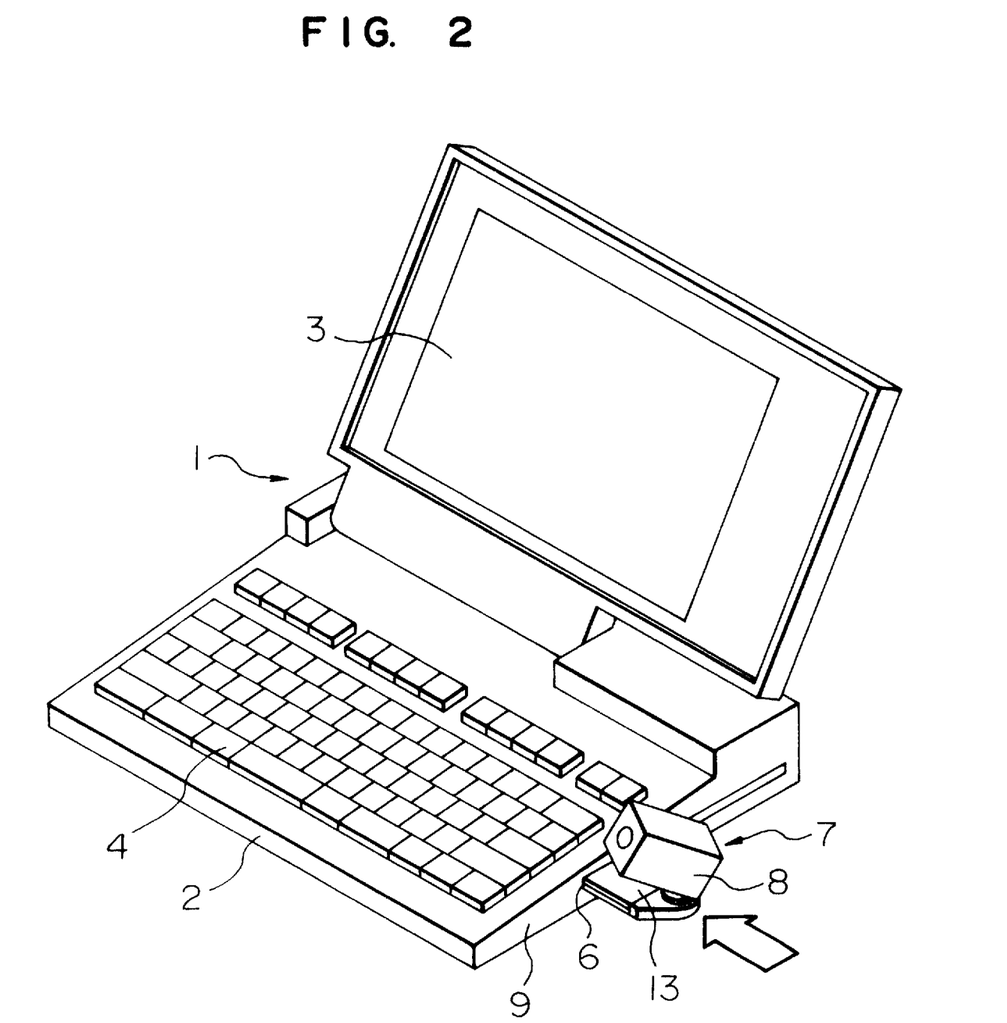
FIG. 2 is a perspective view showing the external appearance of the first embodiment of the present invention when applied to another computer system.
Figure 3:
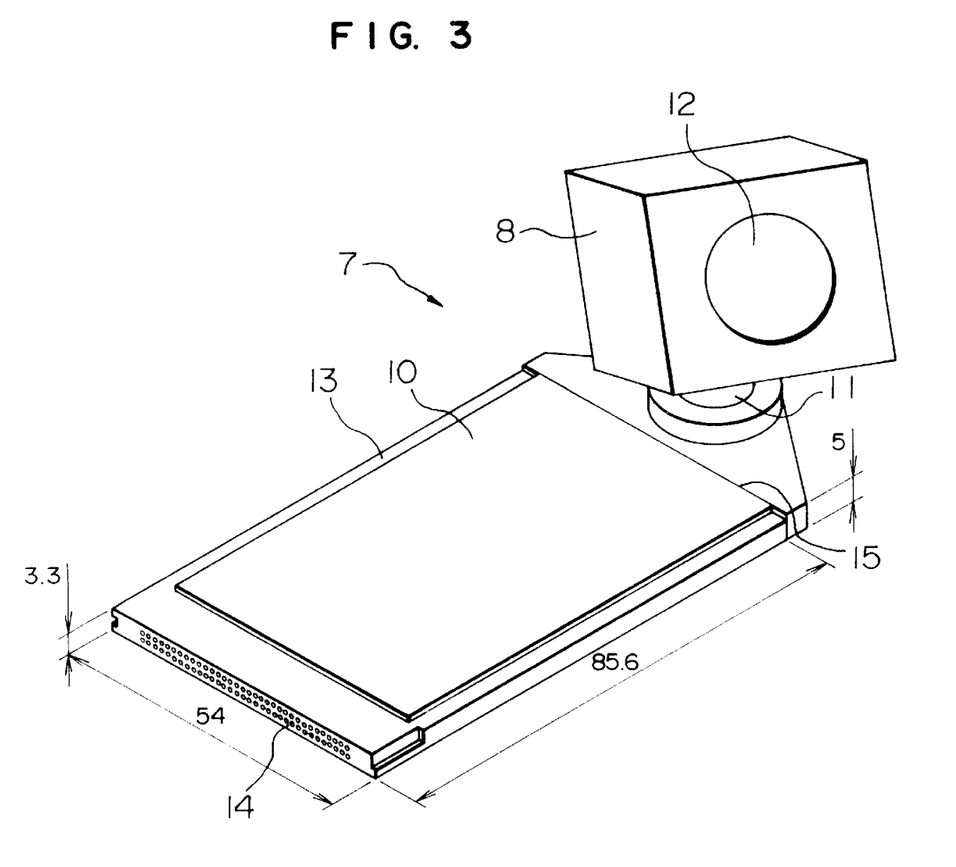
FIG. 3 is a perspective view showing the external appearance of an electronic camera according to the first embodiment of the present invention.

A first embodiment of the present invention is shown in FIGS. 1, 2 and 3. A mounting apparatus of this embodiment shown FIG. 1 includes a computer system, generally designated 1; a computer system body 2; a display screen 3; a keyboard 4 for operating the computer system; and an electronic camera 7 which may be a video camera or the like. The computer system body 2 has the display screen 3 on the front surface 5 thereof and a connection slot 6 positioned below the display screen 3. A holder 13 of the electronic camera 7 is inserted into the connection slot 6 for connecting the electronic camera 7 with the computer system. The electronic camera 7 includes a camera head 8 as an imaging means which is rotatable in the horizontal or vertical direction.

FIG. 2 shows the mounting apparatus of this embodiment when applied to a lap-top type computer system, generally designated 1. The configuration of FIG. 2 includes a computer system body 2; a display screen 3; a keyboard 4; and an electronic camera 7. The computer system body 2 is provided with a connection slot 6 on a side face thereof. A holder 13 of the electronic camera 7 is inserted into the connection slot 6 in the direction indicated by the arrow for connecting the electronic camera 7 with the computer system 1. The electronic camera 7 includes a camera head 8 as an imaging means which is rotatable in the horizontal or vertical direction.

FIG. 3 shows the electronic camera 7 in greater detail. The electronic camera 7 includes a signal processing unit 10; a card connector 14 disposed at one end of the signal processing unit 10; a supporting post 11 disposed at the other end of the signal processing unit 10; and a camera head 8 rotatably supported by the supporting post 11. The signal processing unit 10 and the card connector 14 may be implemented respectively in the card dimensions and the connector dimensions defined by, for example, JEIDA/PCMCIA (Japan Electronic Industry Development Association/Personal Computer Memory Card International Association) which serves as the standard in the industry. In conformity to the standard, a card type connector may be formed so as to be inserted into a slot in a computer system. The card dimensions defined by the standard for Type I cards are the longitudinal side of 85.6 mm; the transverse side of 54 mm; connector thickness of 3.3 mm; and substrate thickness of 3.3 mm. A different substrate thickness is also defined by the standard for Type II cards, which ranges from 3.3 mm to 5 mm. The number of pins in a connector is defined to be 68 for both Type I and Type II. Since the standard connector configuration is employed, the electronic camera may be removably connected commonly to a variety of computer systems having different specifications.

The camera head 8 is connected to the signal processing unit 10 through a camera head connector 15, and therefore can be separated from the signal processing unit 10. The supporting post 11 supports the camera head 8 rotatably in the horizontal or vertical direction.

Figures 4, 4A:
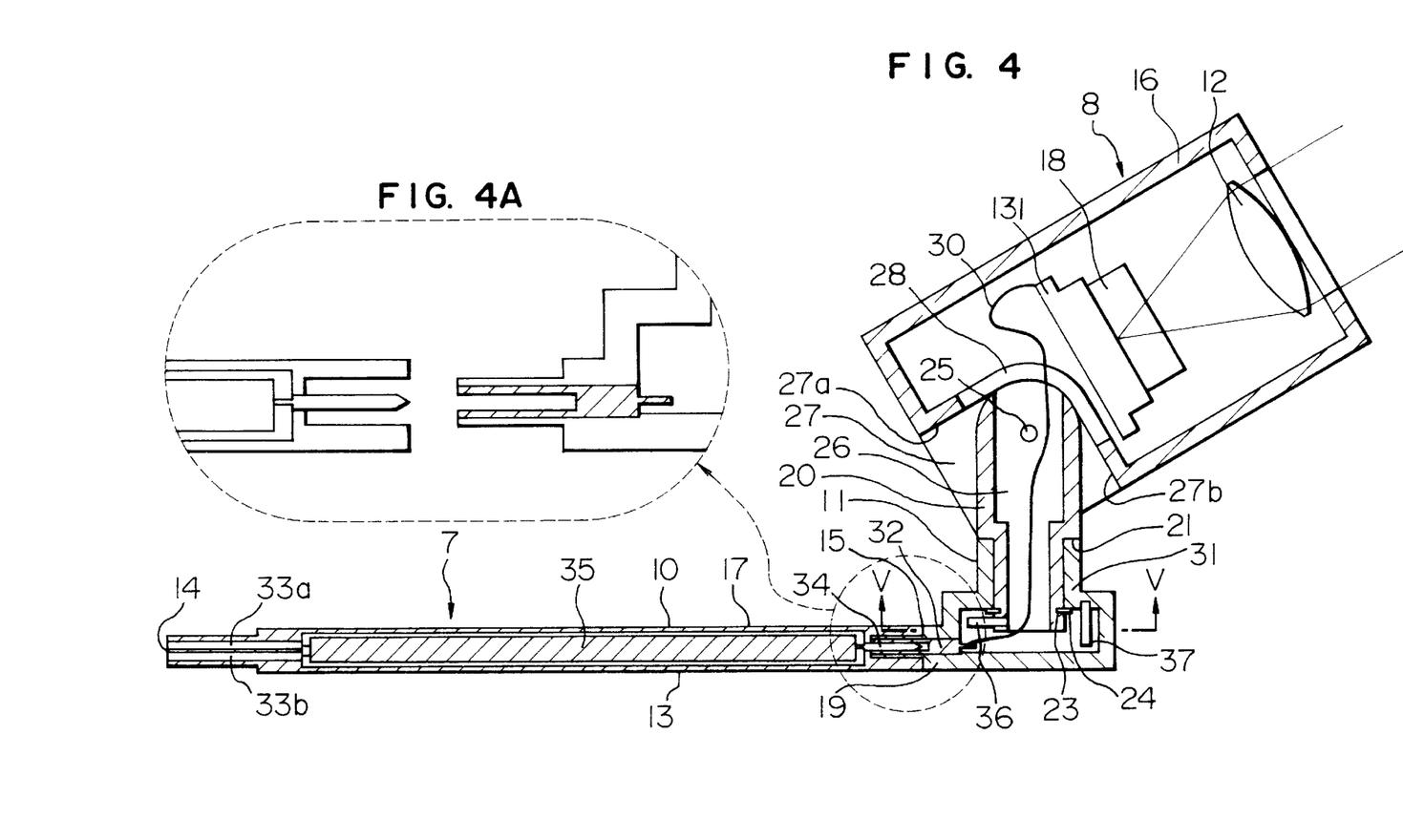
FIG. 4 is a cross-sectional view taken along a center line of the electronic camera shown in FIG. 3.
FIG. 4A is an enlarged cross-sectional view showing part of the electronic camera of FIG. 4 when separated.

FIG. 4 shows a cross-sectional view of the electronic camera of FIG. 3 taken along a center line thereof. The signal processing unit 10 has a signal processing substrate 35 incorporated in a case 17, and is provided with the card connector 14 at one end and the camera head connector 15 at the other end. The card connector 14 contains two vertically arranged receptors 33a, 33b into which pins (not shown) in the connection slot 6 of the computer system are inserted. The camera head connector 15 is constructed such that pins arranged in the signal processing unit 10 are inserted into a receptor 32 of the supporting post 11. A circular portion in FIG. 4 surrounded by a broken line is shown in an enlarged scale in FIG. 4A for depicting a separated state of the signal processing unit 10 and the supporting post 11. The supporting post 11 is composed of a supporting case 19 and a cylinder 20. The supporting case 19 is formed integrally with a hollow column 31. The cylinder 20 is hollow and includes a lower portion which is narrower than an upper step portion 22 and serves as an inserted portion 21. The inserted portion 21 is inserted into the column 31 with the step portion 22 abutting to the top of the column 31. The inserted portion 21 is formed around the periphery of a lower end with a groove in which a fall-out preventing ring 24 is fitted. The fall-out preventing ring 24 prevents the cylinder 20 from falling out from the column 31. In this way, the cylinder 20 is made rotatable in the horizontal direction relative to the supporting case 19.

Figure 5:
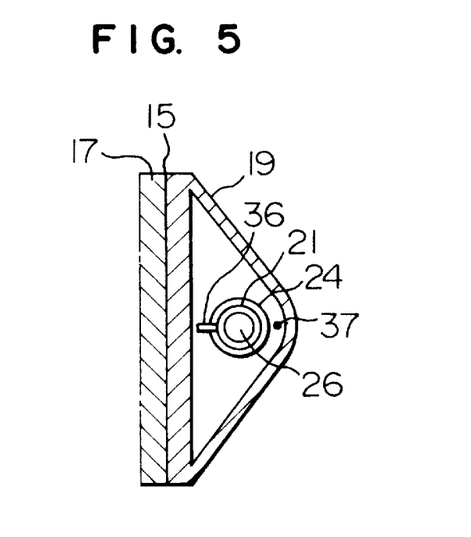
FIG. 5 is a cross-sectional view taken along a V—V line of FIG. 4.

As shown in FIGS. 4, 5, for limiting the rotating angular distance of the camera head 8 in the horizontal direction, an arm 36 is implanted on the lower end of the inserted portion 21, while a stopper 37 is implanted on the supporting case 19. The rotation of the camera head 8 causes the arm 36 to rotate together, and when the arm 36 abuts to the stopper 37, the rotation of the arm 36 and hence that of the camera head 8 is stopped. In this way, this structure prevents the camera head 8 from rotating over more than 360° to twist off a conductor line 30.

The camera head 8 is composed of a camera case 16; an imaging sensor 131 for generating an electric two-dimensional image information signal; a lens 12 for focusing the image of a subject on the imaging sensor; and a quartz filter 18 inserted between the imaging sensor 131 and the lens 12. The sensor 131, the lens 12 and the quartz filter 18 are disposed in the camera case 16. The quartz filter 18 serves to reduce moire and cut infrared rays in order to stabilize an image taken into the camera head 8. An output of the imaging senor 131 is led to the receptor 32 through the conductor line 30. A hollow movable region 27 is formed behind the camera case 16 such that the cylinder 20 of the supporting post 11 is inserted thereinto, and the camera case 16 is rotatably supported by a shaft 25 which is fixed on an inner wall surface 26 opposite to the cylinder 20. A first stopper 27a and a second stopper 27b are disposed in the movable region 27 in such a manner that the camera head 8 is oriented in the horizontal direction when the cylinder 20 is in contact with the second stopper 27b, and in the vertical direction when the cylinder 20 is in contact with the first stopper 27a. Stated another way, the camera head 8 is rotatable over 90° from the horizontal direction to the vertical direction relative to the perpendicular direction. The rotatable angle range, however, is not necessarily limited to 90° but may be set to an arbitrary angular distance. The camera case 16 is formed with a throughhole 28 for passing the conductor line 30 thereinto.

Figure 6:
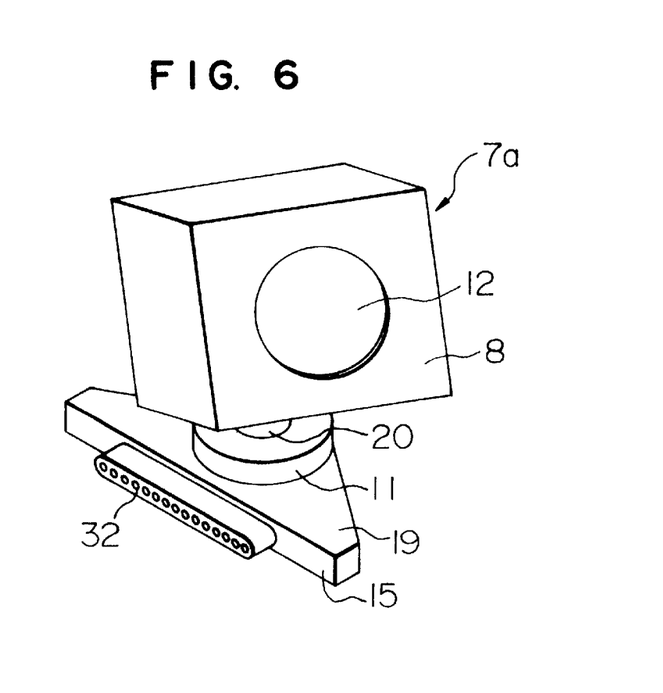
FIG. 6 is a perspective view showing part of the electronic camera of FIG. 3.

FIG. 6 depicts an electronic camera section 7a including the camera head 8 and the supporting post 11, when separated from the camera head connector 15 of the electronic camera 7 shown in FIG. 3. The supporting post 11 includes the supporting case 19 and the cylinder 20 for rotatably supporting the camera head 8. A receptor 32 is disposed on the camera head connector 15 of the supporting case 19. When the signal processing unit 10 is incorporated in the computer system body 2, the electronic camera 7a may be directly connected to the computer system body 2.

Figure 7:
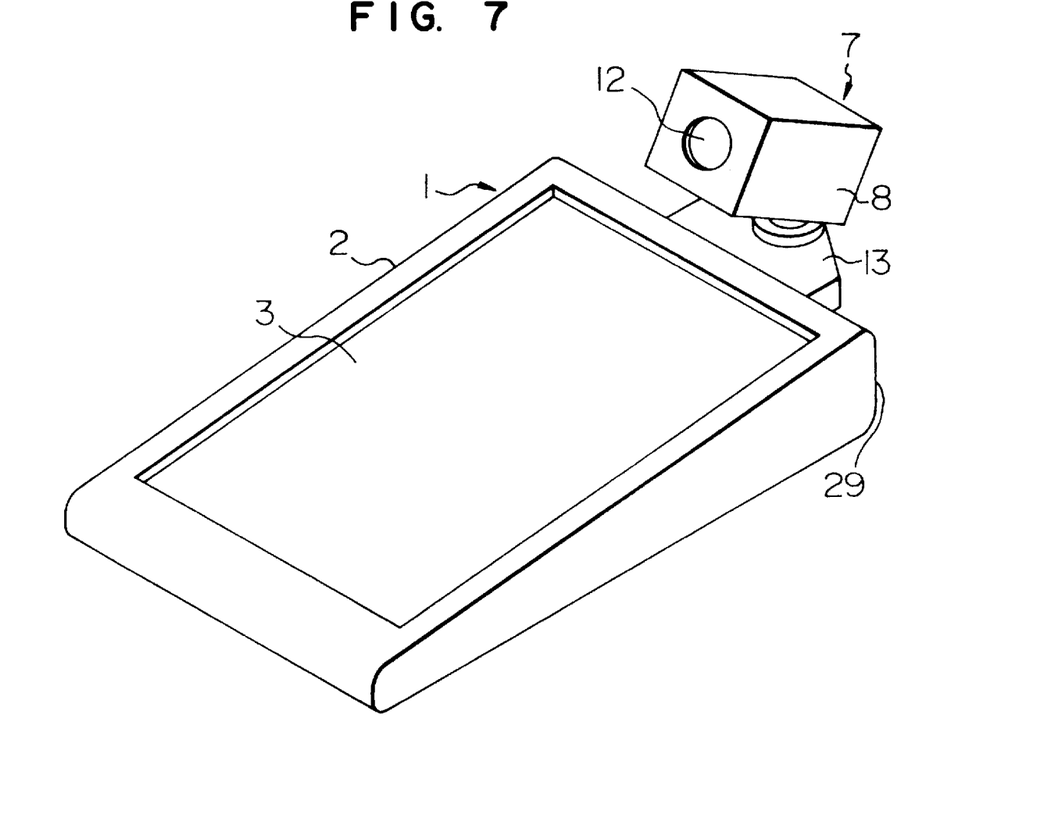
FIG. 7 is a perspective view showing the external appearance of a second embodiment of the present invention.
Figure 8:
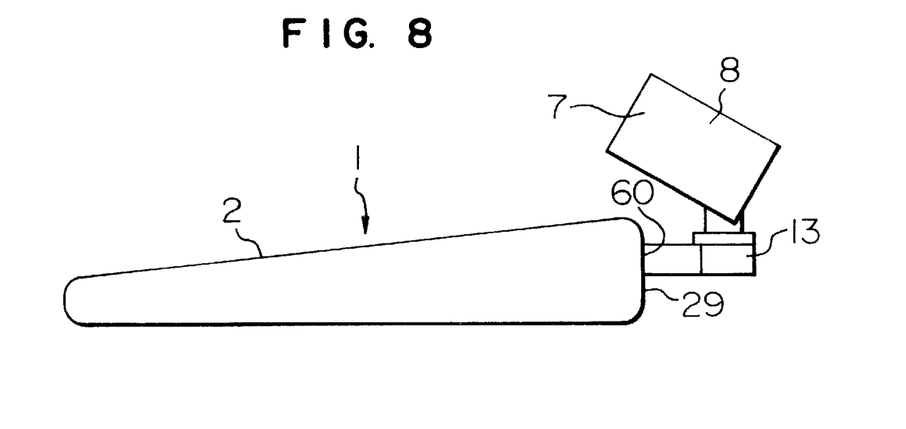
FIG. 8 is a lateral view of the second embodiment shown in FIG. 7.
Figure 9:
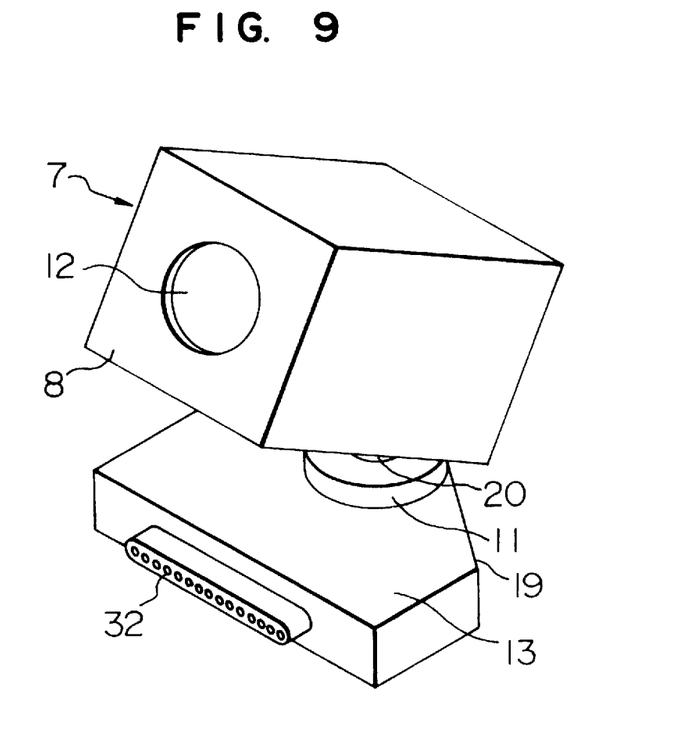
FIG. 9 is a perspective view showing the external appearance of an electronic camera according to the second embodiment of the present invention.

FIGS. 7, 8 and 9 shows a second embodiment of the present invention for use with a palm top type computer system, wherein an electronic camera 7 is connected to a back surface 29 of a computer system body 2 by way of example. These drawings also show another example of a connector. More specifically, FIG. 7 is a perspective view showing the external appearance of the computer system 1; FIG. 8 a lateral view of the same; and FIG. 9 the external appearance of the electronic camera 7. The electronic camera 7 is connected to the computer system 1 by inserting a holder 13 into a connection portion 60 disposed on the back surface 29 of the computer system body 2. The computer system 1 is a pen-input type computer which has a display screen 3 formed of a touch panel, such that a desired item is selected from a menu displayed on the display screen 3, and data is directly inputted by writing on the display screen 3 with a pen.

FIG. 9 shows the electronic camera 7 which is composed of a camera head 8; a supporting post 11 for rotatably supporting the camera head 8; and a holder 13 for holding the supporting post 11. The holder 13 has a receptor 32, while the supporting post 11 has a cylinder 20. A signal processing unit is incorporated in the camera head 8 or the supporting case 19. An output of the electronic camera 7 may be a digitized signal or an analog image signal, as is the case of the camera signal processing circuit of the known example shown in FIG. 1, provided that an analog-to-digital convertor (ADC) is provided at the input of an image data processing circuit at a latter stage.

Figure 10:
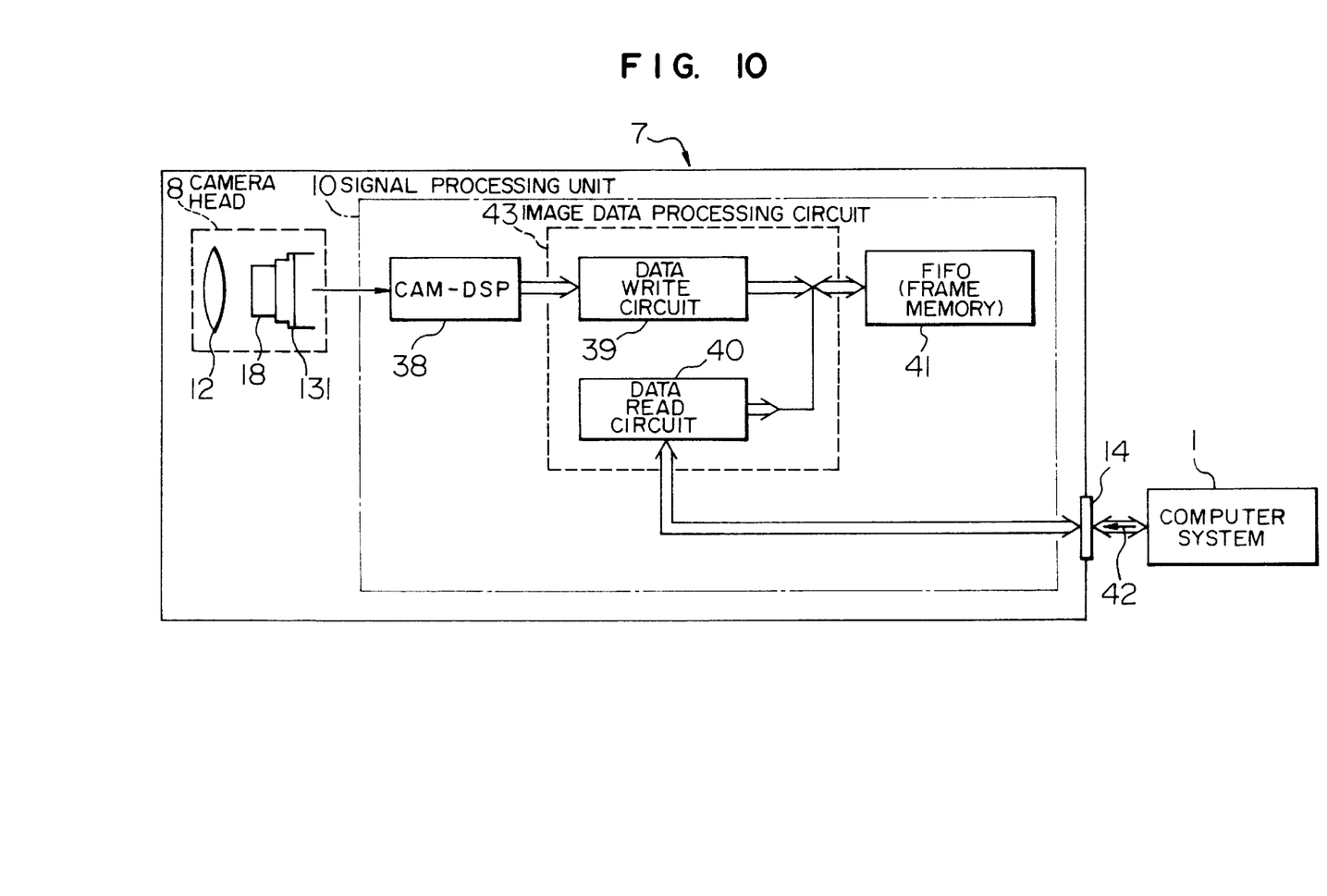
FIG. 10 is a block diagram showing an example of a circuit configuration in the first and second embodiments.

FIG. 10 shows a block diagram of an electronic camera system which includes a computer system 1; an electronic camera 7; a camera head 8; a signal processing unit 10; and a card connector 14. An image information signal generated by the camera head 8 is processed by the signal processing unit 10, and then inputted to the computer system 1 through the card connector 14.

The signal processing unit 10 is composed of CAM-DSP 38; an image data processing circuit 43; and a frame memory 41.

The image data processing circuit 43 includes a data write circuit 39 and a data read circuit 40. The data write circuit 39 accesses to the frame memory 41 for writing image data from the CAM-DSP 38 into the frame memory 41. The data read circuit 40 accesses to the frame memory 41 for reading image data written therein and transmitting the read image data to the computer system 1 through the connector 14.

Conveniently, the transmission of image data to the computer system 1 is executed in synchronism with a clock signal 42 such as a clock or the like generated by the computer system 1. In this case, for executing a data write in synchronism with an operating clock of the signal processing unit 10 in the electronic camera 7 and a data read in synchronism with an operating clock from the computer system 1, a so-called FIFO (first-in first-out) frame memory 41 may be employed. The transmission of data synchronized with different clocks by the use of such FIFO memory may be realized by known techniques in the field of digital signal processing.

While FIGS. 3, 6 show an example of the camera head 8 which employs the imaging sensor 131 as a circuit element as shown in FIG. 4, the present invention is not limited to this particular configuration. For example, as shown in FIG. 9, a driver circuit for driving an imaging sensor, a correlated double sampling (CDS) circuit added to a signal output section of the imaging sensor, an AGC circuit, and so on, shown in the aforementioned known example, i.e., Ohtsubo et al., may be disposed in the camera head 8 or in the supporting case 19. Further, since the above-mentioned CAM-DSP 38 can be constituted of an extremely small LSI, the camera head 8 may be constructed to incorporate the CAM-DSP 38.

As described above, since the camera head serving as an imaging means is supported rotatably in the vertical direction or the horizontal direction relative to the digital signal processing unit or the connector, a subject can be readily captured in the visual field of the camera. More specifically, part or all of a user sitting to the front of a computer system having a display screen can be readily captured from the frontal direction, so that the image of the user or subject can be readily displayed on the display screen of the computer system.

The signal processing unit for the electronic camera such as a video camera is provided at the output thereof with a connector, such that the electronic camera is connected to a computer system by inserting the connector into a connection slot provided in the front surface, side surface, top surface, bottom surface, or a back surface of the computer system. Since this structure enables the camera to be directly connected to the computer system, a signal transmission path from the camera to the computer system can be reduced to an extremely short distance. Therefore, a high speed digital signal generated by the electronic camera such as a video camera employing DSP can be transmitted without being converted to an analog signal, so that capture of images into the computer system can be realized at a low cost and with low power consumption.

We claim:

1. An apparatus for removably mounting an electronic camera to a computer system, wherein:

said computer system has a slot, formed on an outer surface thereof, including input terminals inside thereof for receiving an image signal from the outside;

said electronic camera includes a camera head protruded from said computer system; a holder having at one end thereof a connector which is removably inserted into said slot of the computer system for electrically and mechanically coupling said electronic camera to said computer system; and a supporter fixedly mounted on the holder for rotatably and swivelally supporting said camera head at the other end of said holder such that an imaging direction of said camera head is freely adjustable in horizontal and vertical directions within predetermined ranges independent of adjustment movement of said computer system.

2. An apparatus according to claim 1, wherein said holder and said supporter are constructed to be removably coupled to each other at engaging surfaces thereof, and a connector is provided on one of said engaging surfaces of said holder and said supporter, and a receptor is provided on the other engaging surface.

3. An apparatus according to claim 2, wherein:
said holder has a signal processing unit for processing a video signal from said camera head, and an output terminal for outputting a signal from said signal processing unit to said connector.

4. An apparatus according to claim 1, further comprising a signal processing unit for processing a video signal from said camera head.

5. An apparatus according to claim 4, wherein:
said signal processing unit includes an analog-to-digital (A/D) convertor for converting said video signal to a digital video signal and outputting the digital video signal as video data.

6. An apparatus according to claim 5, wherein:
said signal processing unit has a frame memory; data writing means for recording said video data from said A/D convertor into said frame memory; and means for reading video data written in said frame memory.

7. An apparatus according to claim 1, wherein:
said supporter has a cylindrical portion for supporting said camera head rotatably in the horizontal direction; and a shaft portion for supporting said camera head rotatably in the vertical direction.

8. An apparatus according to claim 1, wherein said computer system includes a display, and the imaging direction of said camera head is capable of being set toward a direction to which a screen of said display is directed.

9. An apparatus according to claim 1, wherein said electric camera further includes an imaging sensor for picking up an object, and signal processing means for processing a signal from said imaging sensor to generate an image signal and outputting the image signal through said connector.

10. An electric camera for being connected to a personal computer, comprising:
a card-shaped holder;
a connector fixed to one end of said holder;
a supporter fixed to another end of said holder;
a camera head including a lens system and an imaging sensor, said camera head being rotatably and swivelally mounted on said supporter to be adjustably aimable within predetermined horizontal and vertical ranges; and
wherein said supporter and said camera head protrude from the personal computer when said connector is inserted into a slot located on the exterior of said personal computer.

11. An electric camera according to claim 10, wherein said holder includes circuits for processing signals from said image sensor and outputting processed signals through said connector.

12. An electric camera according to claim 10, wherein dimensions of said holder and said connector are formed according to PCMCIA (Personal Computer Memory Card International Standard Association) Type I Standard.

13. An electric camera according to claim 10, wherein dimensions of said holder and said connector are formed according to PCMCIA (Personal Computer Memory Card International Standard Association) Type II Standard.

14. An electric camera according to claim 10, wherein said holder and said supporter are constructed to be removably coupled to each other, and a connector is provided on one of engaging surfaces of said holder and said supporter, and a receptor is provided on an opposing engaging surface.

15. An electric camera according to claim 10, wherein said electric camera further includes an imaging sensor for picking up an object, and signal processing means for processing a signal from said imaging sensor to generate an image signal and outputting the image signal through said connector.

16. The camera according to claim 10, wherein said camera head is more specifically adjustably aimable within a horizontal range which is less than 360°.

17. The camera according to claim 10, wherein said camera head is more specifically adjustably aimable within a vertical range of up to 90°.

18. The camera according to claim 10, wherein said camera head is more specifically adjustably aimable within a horizontal range which is less than 360° and a vertical range of up to 90°.

19. A removeably, swivelable electronic camera for a computer system, wherein:
said computer system has a slot, formed on an outer surface thereof, including input terminals inside thereof for receiving an image signal from the outside;
said electronic camera includes a camera head protruded from said computer system; a holder having at one end thereof a connector which is removably inserted into said slot of the computer system for electrically and mechanically coupling said electronic camera to said computer system; a supporter fixedly mounted on the holder and being swivelally adjustable at the other end of said holder such that a positioning direction of said supporter is freely adjustable within a first predetermined swivel range with respect to said holder; and a rotator swivelally mounting said camera head on said supporter such that an imaging direction of said camera head is freely adjustable within a second predetermined swivel range with respect to said supporter; wherein an adjustability of said supporter within said first predetermined swivel range and an adjustability of said camera head within said second predetermined swivel range allows said imaging direction of said camera head to be swivelally adjustable with respect to said computer system, within a predetermined directing range.

20. An electronic camera according to claim 19, wherein said supporter is more specifically swivelally adjustable within a first plane with respect to said holder and for less than 360°, and said camera head is more specifically swivelally adjustable within a second plane with respect to said supporter and for substantially 90°.

21. A removable, swivelable electronic camera for removable mounting to a peripheral slot formed on an outer surface of a computer system, said electronic camera having a modular-type construction comprising:
a card-type signal processor unit being rigidly and removeably mountable within said peripheral slot, said card-type signal processor unit having signal processing circuits, card-connector terminals for interconnecting with slot terminals within said peripheral slot of said computer system, and camera-mounting terminals; and a camera unit comprising a supporting case unit being rigidly and removeably mountable on said card-type signal processor unit and having camera-connector terminals for interconnecting with said camera-mounting terminals of said card-type signal processor unit, a camera head unit including at least one of a lens system and an imaging sensor, and a swivel unit mounting said camera head unit to said supporting case unit such that an aiming direction of said camera head unit can be three-dimensionally pivotally adjusted and supported with respect to said supporting case unit;

wherein said card-type signal processor unit and said camera unit are removably connectable to each other so as to allow separate and independent replacement of either of said card-type signal processor unit and said camera unit;

wherein said swivel unit comprises:

a supporter post mounted on said supporting case unit and being rotatably adjustable within a predetermined rotation range with respect to said supporting case unit; and a swivel arrangement swivelally mounting said camera head unit on said supporter post such that an imaging direction of said camera head unit is freely adjustable within a predetermined swivel range with respect to said supporter post;

wherein a rotatable adjustability of said supporter post within said predetermined rotation range and a swivel adjustability of said camera head within said predetermined swivel range allows said aiming direction of said camera head to be three-dimensionally adjustable within a predetermined aiming range with respect to said computer system.

22. An apparatus for removably mounting an electronic camera to a computer system, wherein:

said computer system has a slot, formed on an outer surface thereof, including input terminals inside thereof for receiving an image signal from the outside;

said electronic camera includes a camera head protruded from said computer system; a holder having at one end thereof a connector which is removably inserted into said slot of the computer system for electrically and mechanically coupling said electronic camera to said computer system; and a supporter fixedly mounted on the holder for rotatably supporting said camera head at the other end of said holder such that an imaging direction of said camera head is freely adjustable independent of adjustment movement of said computer system, wherein an arm rotating together with said camera head abuts to a stopper mounted on said supporter so that this structure prevents said camera head from rotating over more than 360°.

23. The apparatus according to claim 22, wherein:

said supporting post has a cylindrical portion for supporting said camera head rotatably in the horizontal direction; and a supporting case for supporting said cylindrical portion;

said cylindrical portion has said arm; and said supporting case has said stopper.

24. An electric camera for being connected to a personal computer, comprising:

a card-shaped holder;

a connector fixed to one end of said holder;

a supporter fixed to another end of said holder;

a camera head including a lens system and an imaging sensor, said camera head being rotatably mounted on said supporter; and wherein said holder includes circuits for processing signals from said image sensor and outputting processed signals through said connector; said supporter supports said camera head rotatably in a predetermined direction; an arm rotating together with said camera head abuts to a stopper mounted on said supporter so that this structure prevents said camera head from rotating more than 360°.

25. A removeably, swivelable electronic camera for a computer system, wherein:

said computer system has a slot, formed on an outer surface thereof, including input terminals inside thereof for receiving an image signal from the outside;

said electronic camera includes a camera head protruded from said computer system; a holder having at one end thereof a connector which is removably inserted into said slot of the computer system for electrically and mechanically coupling said electronic camera to said computer system; a supporter fixedly mounted on the holder and being swivelally adjustable at the other end of said holder such that a positioning direction of said supporter is freely adjustable within a first predetermined swivel range with respect to said holder; and a rotator swivelally mounting said camera head on said supporter such that an imaging direction of said camera head is freely adjustable within a second predetermined swivel range with respect to said supporter; wherein an adjustability of said supporter within said first predetermined swivel range and an adjustability of said camera head within said second predetermined swivel range allows said imaging direction of said camera head to be swivelally adjustable with respect to said computer system, within a predetermined directing range; and an arm rotating together with said camera head abuts to a stopper mounted on said supporter so that said first predetermined swivel range is less than 360°, and another stopper of said camera head is contacted with a cylindrical portion of said supporter so that said second predetermined swivel range is substantially 90°.

* * * * *